US 6,644,633 B2

(12) United States Patent
Graeve

(10) Patent No.: US 6,644,633 B2
(45) Date of Patent: Nov. 11, 2003

(54) HYDRAULIC DAMPING BUSH

(75) Inventor: Arndt Graeve, Koblenz (DE)

(73) Assignee: Trelleborg Automotive Technical Centre GmbH, Hoehr-Grenzhausen (DE)

( * ) Notice: Subject to any disclaimer, the term of this patent is extended or adjusted under 35 U.S.C. 154(b) by 0 days.

(21) Appl. No.: 10/298,397

(22) Filed: Nov. 18, 2002

(65) Prior Publication Data

US 2003/0098534 A1 May 29, 2003

Related U.S. Application Data

(63) Continuation of application No. PCT/EP01/05680, filed on May 17, 2001.

(30) Foreign Application Priority Data

May 18, 2000 (DE) .......................................... 100 24 536

(51) Int. Cl.[7] ........................... F16M 15/04; F16F 3/00
(52) U.S. Cl. ................................. 267/140.12; 267/141.2
(58) Field of Search .................. 267/140.12, 141.2, 267/141.4; 248/562, 609, 636

(56) References Cited

U.S. PATENT DOCUMENTS

| 4,667,942 A | | 5/1987 | Bitschkus et al. | |
|---|---|---|---|---|
| 4,700,934 A | | 10/1987 | Andrä et al. | |
| 4,739,979 A | | 4/1988 | Kanda | |
| 4,763,884 A | * | 8/1988 | Matsui et al. | 267/140.11 |
| 4,899,997 A | | 2/1990 | Thorn | |
| 4,953,833 A | | 9/1990 | Schmidt et al. | |
| 5,005,810 A | | 4/1991 | Sawada et al. | |
| 5,013,012 A | * | 5/1991 | Jouade | 267/140.11 |
| 5,080,230 A | | 1/1992 | Winnard | |
| 5,232,209 A | | 8/1993 | de Fontenay | |
| 5,299,788 A | * | 4/1994 | Kanda | 267/140.12 |
| 5,890,706 A | | 4/1999 | Court | |
| 6,007,059 A | | 12/1999 | Mayer | |
| 6,029,960 A | * | 2/2000 | Gab | 267/140.12 |

FOREIGN PATENT DOCUMENTS

| DE | 35 14 268 A1 | 10/1986 |
|---|---|---|
| DE | 36 32 612 A1 | 4/1987 |
| DE | 192 32 098 A1 | 2/1997 |
| DE | 197 12 343 C1 | 9/1998 |
| EP | 0 199 240 A2 | 10/1986 |
| EP | 0 490 724 A1 | 6/1992 |
| GB | 2 304 170 A | 3/1997 |
| JP | 59 231 236 A | 12/1984 |
| JP | 62 188 832 A | 8/1987 |
| JP | 10 096 442 A | 4/1998 |
| JP | 11 063 085 A | 3/1999 |

* cited by examiner

Primary Examiner—Christopher P. Schwartz
(74) Attorney, Agent, or Firm—Laurence A. Greenberg; Werner H. Stemer; Ralph E. Locher

(57) ABSTRACT

A hydraulic damping bush, more particularly in automotive applications, damps loads in a main loading direction. The bush includes an inner sleeve, an outer sleeve, a resilient mounting assembly disposed between the inner sleeve and the outer sleeve, as well as at least one end cap connecting the inner sleeve to the outer sleeve. The at least one end cap caps the space enclosed by the inner sleeve and outer sleeve from the environment. Two chambers are provided charged with a hydraulic damping fluid and interconnected via a transfer duct. The main loading direction is oriented parallel to a longitudinal axis of the inner sleeve and outer sleeve. The end caps can be formed separate from the resilient mounting assembly. Each of the chambers is defined by the resilient mounting assembly or a component adjoining the latter or by one of the end caps. This permits optimum material compatibility for facilitated production and assembly as well as a modular configuration of the bush.

25 Claims, 3 Drawing Sheets

HYDRAULIC DAMPING BUSH

CROSS-REFERENCE TO RELATED APPLICATION

This application is a continuation of copending International Application No. PCT/EP01/05680, filed May 17, 2001, which designated the United States and was not published in English.

BACKGROUND OF THE INVENTION

Field of the Invention

The present invention relates to a hydraulic damping bush or bushing, more particularly in automotive applications, for damping loads in a main loading direction. The hydraulic damping bush or bearing includes an inner sleeve, an outer sleeve, a resilient mounting assembly disposed between inner sleeve and outer sleeve, at least one end cap connecting the inner sleeve to the outer sleeve and capping the space enclosed by the inner sleeve and outer sleeve from the environment, and two chambers charged with a hydraulic damping fluid and interconnected via a transfer duct. The transfer duct has an inlet and an outlet. The main loading direction is oriented parallel to a longitudinal axis of the inner sleeve and outer sleeve. The end caps are formed separate from the resilient mounting assembly and each of the chambers is limited by the resilient mounting assembly or a member adjoining the resilient mounting assembly and by one of the end caps.

Such a bush is disclosed in U.S. Pat. No. 5,005,810. This prior-art axial bush includes an inner sleeve and an outer sleeve interconnected via a resilient mounting assembly. The resilient mounting assembly includes a space that is provided with two chambers separated by a separator. The separator interconnects both chambers via a transfer duct that includes an inlet and an outlet.

A hydraulic damping bush is further described in German Patent Application No. DE 36 12 612 A1. This prior-art bush includes an inner sleeve, an outer sleeve, and a separator including a transfer duct. Provided furthermore are end caps, one of which is produced materially integral with the inner sleeve whilst the other is rigidly connected thereto. To close off the chambers from the environment rubber rings are provided between the end caps and the outer sleeve. The rubber rings must be connected to the end caps and the outer sleeve to provide a seal. Their length varies as a function of the length of the inner sleeve.

Another hydraulic damping bush (mounting) is also described in U.S. Pat. No. 5,890,706. This document discloses a hydraulic mounting that includes an inner sleeve and an outer sleeve interconnected via a resilient (mounting) element in contact with the environment at one end. Provided at the other end of the resilient mounting element and separated by a separator are two chambers charged with a hydraulic fluid. Serving to close off the second chamber from the environment is a thin elastomeric diaphragm (flexible member) integrally configured with the resilient mounting element. Here too, the connection between the resilient mounting element and the elastomeric diaphragm complicate production and assembly.

SUMMARY OF THE INVENTION

It is accordingly an object of the invention to provide a hydraulic damping bush that overcomes the hereinaforementioned disadvantages of the heretofore-known devices of this general type and that permits improved hydraulic damping and that is simple to produce and assemble.

With the foregoing and other objects in view, there is provided, in accordance with the invention, a hydraulic damping bush for damping loads in a main loading direction. The bush includes an inner sleeve, an outer sleeve, a resilient mounting assembly, at least two end caps, two chambers, and a transfer duct. The outer sleeve along with the inner sleeve enclose a space and define a longitudinal direction. The resilient mounting assembly is disposed between the inner sleeve and the outer sleeve. The two end caps connect the inner sleeve to the outer sleeve, cap the space enclosed by the inner sleeve and the outer sleeve, are formed separately from the resilient mounting assembly, and each have a rigid member mutually overlapping in a direction perpendicular to the main loading direction to define an overlapping region. The two chambers are charged with a hydraulic damping fluid. The transfer duct interconnects the two chambers and has an inlet, an outlet, and a main loading direction oriented parallel to the longitudinal axis of the inner sleeve and the outer sleeve. Furthermore, each of the chambers is defined by the resilient mounting assembly, a component adjoining the resilient mounting assembly, or one of the end caps. The inlet and the outlet of the transfer duct are located in the overlapping portion of the rigid members of the resilient mounting assembly and the end caps.

In accordance with a further object of the invention, a bush of the aforementioned kind in that a rigid member of the resilient mounting assembly and a rigid member of the end cap overlap in a direction perpendicular to the main loading direction, wherein the inlet and outlet of the transfer duct are located in the overlapping portion of the rigid members of the resilient mounting assembly and the end caps.

The overlapping of a rigid member of the resilient mounting assembly and the rigid member of the end cap in a direction perpendicular to the main loading direction achieves a pumping effect on movements between the inner sleeve and outer sleeve. This pumping effect facilitates entry of the hydraulic fluid into the transfer duct, enhances the flow through the transfer duct and boosts the hydraulic damping.

The inlet and outlet of the transfer duct are located in the overlapping portion of the rigid members of the resilient mounting assembly and end cap, so that the pumping effect achieved by the overlap on the transfer duct results in a further improvement of the hydraulic damping.

Separately configuring the end caps, on the one hand, and the inner sleeve and outer sleeve as well as the resilient mounting assembly, on the other, now makes it possible to use differing materials as optimized for use in the resilient mounting element or the end caps. The resilient mounting assembly and end caps can now be produced separately and simply assembled in thus resulting in a modular configuration of the bush in accordance with the invention. Preferably, the end caps are also configured separate from the inner sleeve and outer sleeve in this configuration.

The chambers are defined either by the resilient mounting assembly or the end caps or by the components adjoining the resilient mounting assembly and the end caps. These components may be configured more particularly as isolating or plunger components in enabling the response of the bush in accordance with the invention to be adapted to the circumstances in each case.

In this configuration, the resilient mounting assembly is enclosed by the two chambers, the inner sleeve and the outer sleeve with no contact to the environment. In prior-art bushes, the resilient mounting element is always exposed to the environment and thus necessitates use of a special material. This is no longer needed in the bush in accordance with the invention.

In an advantageous further embodiment, the resilient mounting assembly and the end caps are disposed inline in the main loading direction. This results in a simple configuration of the bush in accordance with the invention.

In an advantageous embodiment, the resilient mounting assembly and the end caps are mounted on the inner sleeve and fixed by flanging to the rims of the inner sleeve to thus facilitate assembly. Furthermore, various resilient mounting assemblies and end caps may be combined with each other to thus achieve a modular configuration of the bush.

In an alternative advantageous embodiment, the resilient mounting assembly and inner sleeve are grouped together into a single inner part, on which the end caps are mounted and fixed by flanging the rims of the inner part. Combining the resilient mounting assembly and inner sleeve reduces the number of steps in assembly.

As an alternative, the resilient mounting element may be directly vulcanized to the inner sleeve and outer sleeve so that following mounting of the end caps only the rims need to be flanged in thus furthermore simplifying assembly.

Advantageously, the outer sleeve is fixed by its rims being flanged to make for simple and reliable assembly.

In another advantageous further embodiment, the transfer duct is disposed in the resilient mounting assembly in thus eliminating the need of a separate component for configuring the transfer duct.

The transfer duct may be configured linear and substantially parallel to the main loading direction. This simplifies production whilst improving the flow through the transfer duct in thus achieving enhanced hydraulic damping of the bush in accordance with the invention.

As an alternative, the transfer duct may be configured helical in thus achieving added length and higher damping performance.

To advantage, the bush additionally features a decoupler and/or plunger, as a result of which the response of the bush under load, especially in the higher frequency range, is further enhanced.

In yet another advantageous embodiment, the resilient mounting assembly, and end caps as well as any decoupler or plunger provided, are configured rotationally symmetrical. This rotationally symmetrical configuration results in simplified production and assembly.

In accordance with an advantageous further embodiment, the inner sleeve or inner part is provided with a port for charging the chamber with hydraulic damping fluid. The port is protected by being disposed in the inner sleeve or inner part.

Preferably, the port is closed off by one of the end caps following assembly, i.e. impressing a ball in the port as provided hitherto is now eliminated.

In accordance with an advantageous further embodiment, at least one of the end caps is provided with a port for charging the chamber with hydraulic damping fluid to thus facilitate charging. Ports may also be provided in both the inner sleeve or inner part as well as in one of the end caps.

Other features that are considered as characteristic for the invention are set forth in the appended claims.

Although the invention is illustrated and described herein as embodied in a hydraulic damping bush, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
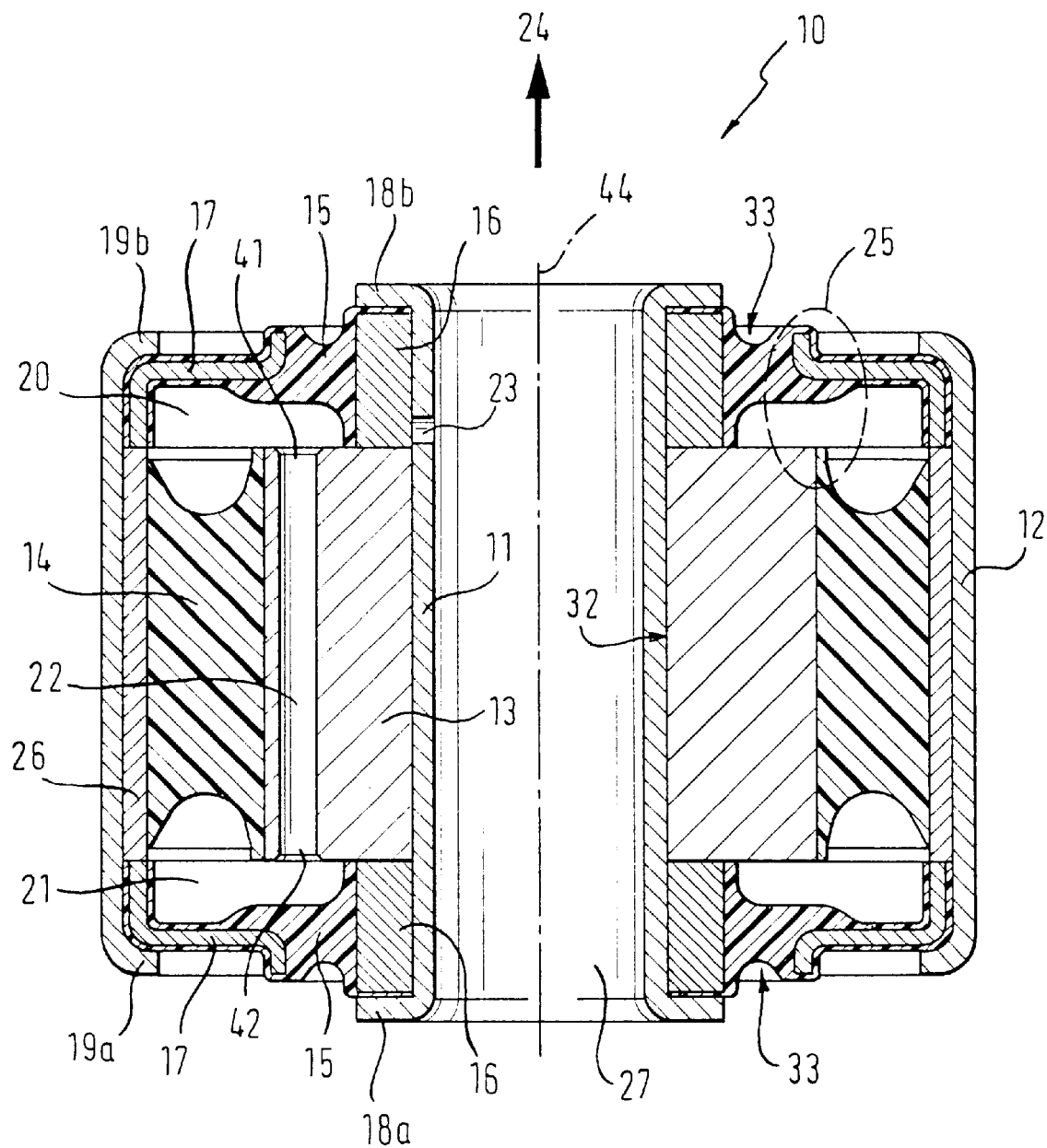
FIG. 1 is a longitudinal sectional view through a first embodiment of a bush according to the invention.

Referring now to the figures of the drawings in detail and first, particularly to FIG. 1 thereof, there is shown a longitudinal section through a first embodiment of a bush 10 in accordance with the invention. The bush 10 includes an inner sleeve 11 including an interior space 27 and an outer sleeve 12. Disposed between the sleeves 11, 12 is a resilient mounting assembly 32 as well as two end caps 33, resulting in the resilient mounting assembly 32 being configured separate from the end caps 33. The bush 10 may be put to use as a strut mount or as an axially damping bush on a vehicle chassis.

Formed between the resilient mounting assembly 32 and each of the end caps 33 is a chamber 20, 21. The two chambers 20, 21 are charged with a hydraulic damping fluid and are interconnected via a transfer duct 22 of the resilient mounting assembly 32. The resilient mounting assembly 32 includes a mounting core 13 and a resilient mounting element 14 as well as an outer sleeve 26. The mounting core 13 and outer sleeve 26 in this configuration are configured rigid as compared to the resilient mounting element 14. The transfer duct 22 is disposed in the mounting core 13 and, in the example embodiment as shown, runs substantially linearly and parallel to the main loading direction 24 of the bush 10. This main loading direction 24 runs parallel to the longitudinal axis 44 of the inner sleeve 11 and outer sleeve 12.

The end caps 33 include a diaphragm 15, an inner ring 16 as well as an insert 17 serving to render the assembly rigid. The diaphragm 15 is produced totally separate from the resilient mounting element 14 and is made of a different material.

The mounting core 13 and insert 17 overlap in a direction perpendicular to the main loading direction 24. This overlap portion is indicated diagrammatically by the broken lines 25. Inlet 41 and outlet 42 of the transfer duct 22 are located in the overlapping portion 25.

Under loading, the inner sleeve 11 and outer sleeve 12 are displaced relative to each other in the main loading direction 24. This results in a change in the volume of the chambers 20, 21 so that hydraulic fluid flows through the transfer duct 22. The resulting hydraulic damping counteracts the exterior load.

Due to the overlap of the rigid members 13, 17, a pumping effect materializes that promotes the entry of the hydraulic fluid into the transfer duct 22. Because inlet 41 and outlet 42 are disposed in the overlapping portion 25, the increase in pressure occurring in the overlapping portion 25 produces an enhanced fluid flow in the transfer duct 22 and thus adds to the improved hydraulic damping.

The resilient mounting assembly 32 and end caps 33 are fixed by flanged rims 18a, 18b, 19a, 19b of the inner sleeve 11 and outer sleeve 12. For assembly, the rims 18a, 19a are flanged in the position as shown in FIG. 1. Subsequently, the lower end cap 33, resilient mounting assembly 32, and upper end cap 33 are mounted on the inner sleeve 11. At the same time, or thereafter, the outer sleeve 12 is mounted. The rings 16 of the end caps 33 and mounting core 13 of the resilient mounting assembly 32 feature the same inner diameter. The outer diameter of the outer sleeve 26 corresponds to the outer diameter of the end caps 33. The outer diameter of the inner sleeve 11 and the inner diameter of the outer sleeve 12 are selected suitably adapted to thus ensure a securely sealed location. Subsequently, the upper rim 19b of the outer sleeve 12 is flanged, the upper rim 18b of the inner sleeve not being flanged at this time, so that the ring 16 of the upper end cap 33 can still be shifted on the inner sleeve 11 in the main loading direction 24.

For charging the chambers 20, 21 as well as the transfer duct 22, the inner sleeve 11 is provided with a port 23. For the charging action the ring 16 of the upper end cap 33 is elevated upwards, the air contained therein then being exhausted by devices, which are not shown, and hydraulic fluid injected. On completion of injection the inner ring 16 is returned downwards, it thereby closes the port 23. After this, the upper rims 18b of the inner sleeve 11 are flanged into the position as shown in FIG. 1. Urging a ball into place to close off the port 23 is no longer necessary.

The resilient mounting assembly 32 as well as the end caps 33 are configured rotationally symmetrical and disposed inline in the main loading direction 24. Because there is no need for a specific angular setting between the resilient mounting assembly 32 and end caps 33, assembly can now be implemented speedily and simply.

By defining the inner diameter and outer diameter of the resilient mounting assembly 32 and of the end caps 33, various components of the bush 10 in accordance with the invention may be combined. Thus, depending on the circumstances in each case, one or more suitable resilient mounting assemblies 32 and end caps 33 may be selected and assembled.

Figure 2:
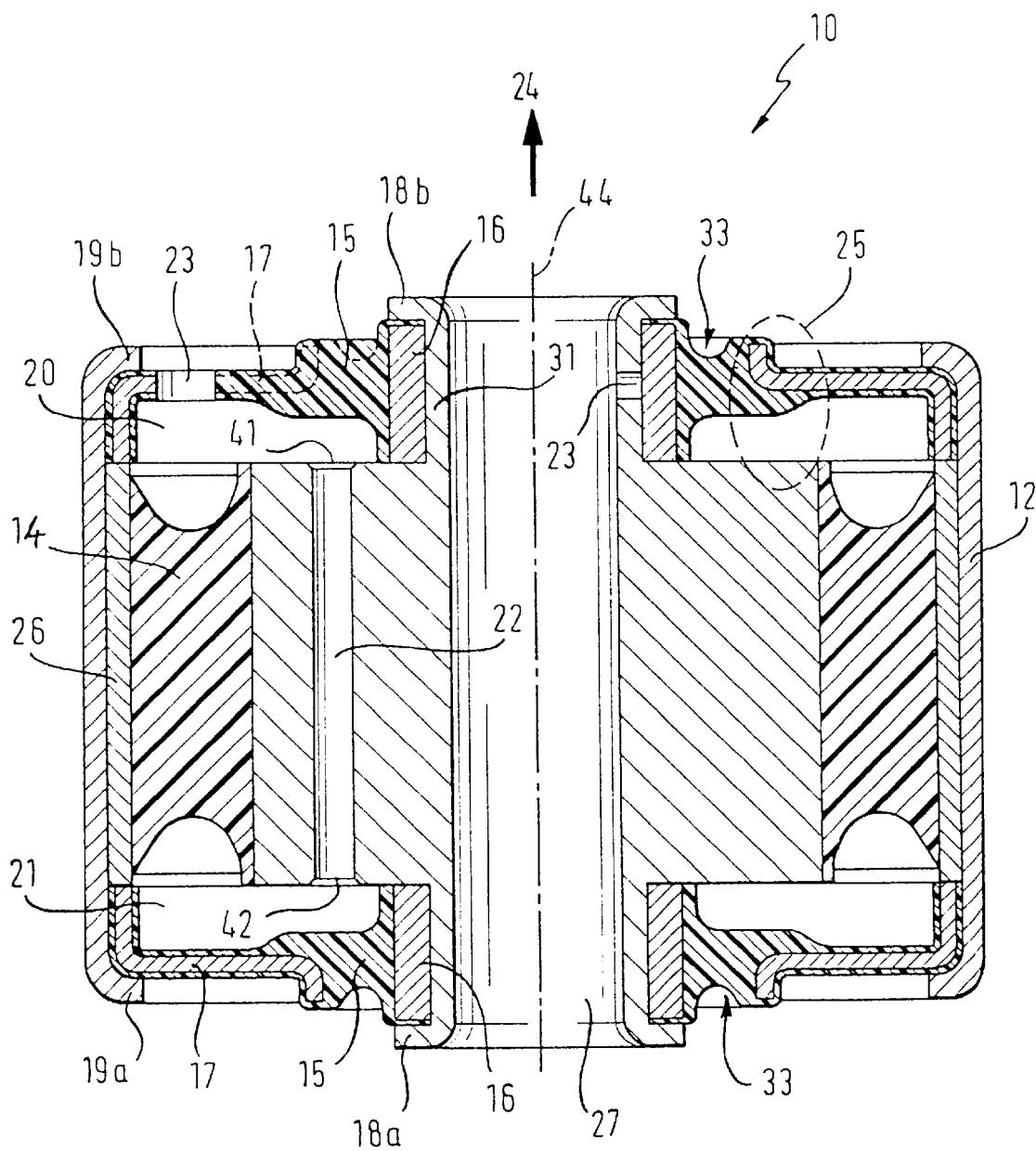
FIG. 2 is a longitudinal sectional view through a second embodiment of a bush.

Referring now to FIG. 2 there is illustrated a second embodiment of a bush 10 in accordance with the invention in a view similar to that as shown in FIG. 1. In this embodiment, the resilient mounting assembly 32 and inner sleeve 11 are combined into an inner part 31. For assembly, the end caps 33 are mounted on the inner part 31 and subsequently fixed by flanging the rims 18a, 18b of the inner part. Here again, a port 23 disposed either in the inner part or in one of the end caps 33 serves for charging. The further components are identical to those as shown in FIG. 1 so that reference is made to the above description in avoiding tedious repetition.

In another embodiment, the inner part 31 as shown in FIG. 2 is joined to the outer sleeve 12 by vulcanizing the resilient mounting element 14 in place, in thus eliminating the outer sleeve 26.

Figure 3:
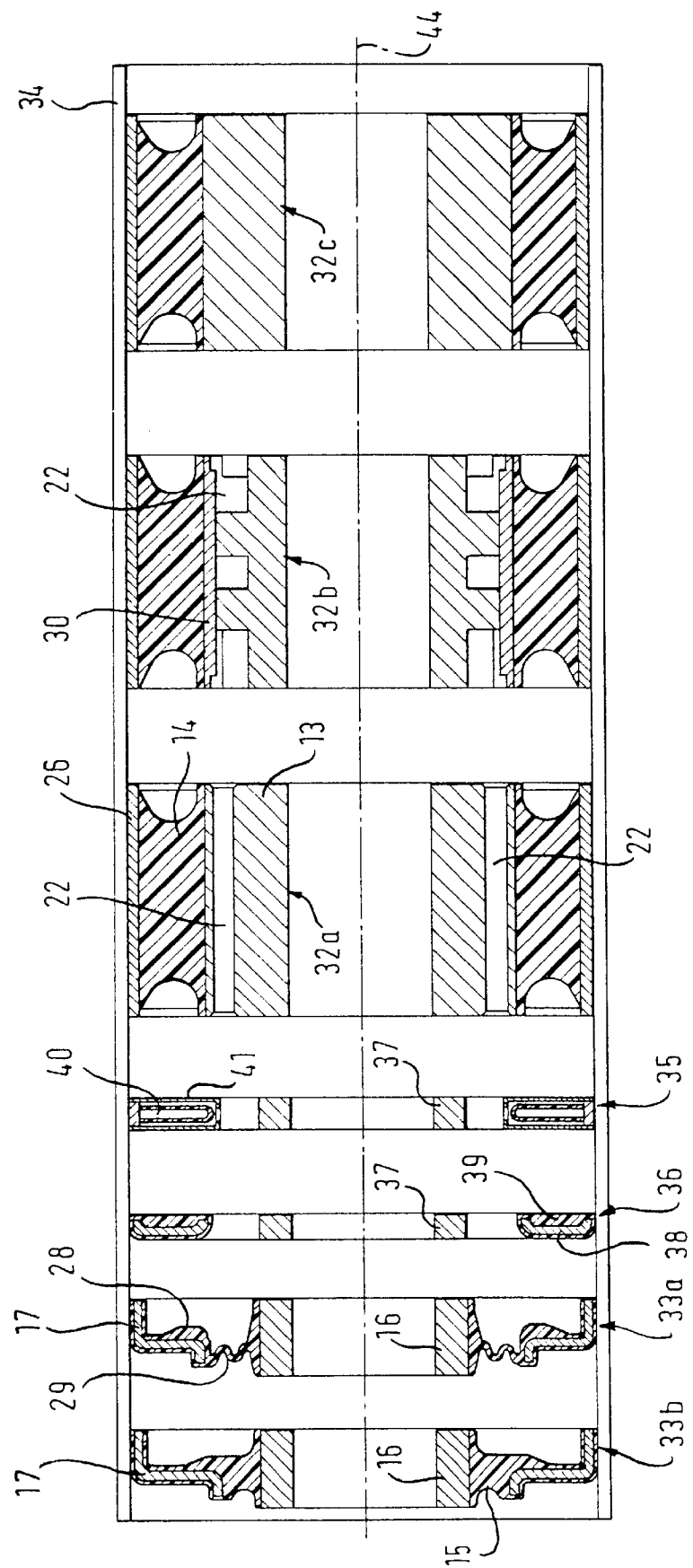
FIG. 3 is a longitudinal sectional view showing a combination of the individual components of the bush.

Referring now to FIG. 3, there is illustrated a longitudinal section through a combination of the components of the bush 10 in a sleeve 34 involving three differing resilient mounting assemblies 32a, 32b, 32c. Provided in the resilient mounting assembly 32a are two linear transfer ducts 22, whereas the resilient mounting assembly 32b features a single transfer duct 22 running helically along the mounting core 13. In the direction of the resilient mounting element 14, the transfer duct 22 may be covered by a further sleeve 30. This helical configuration results in the transfer duct 22 becoming longer in thus intensifying the hydraulic damping.

In the resilient mounting assembly 32c, no transfer duct is provided. In this case, the connection between the two chambers 20, 21 is made via a transfer duct configured separate (not shown).

To adapt to the various circumstances, one of the resilient mounting assemblies 32a, 32b, 32c is selected accordingly. Inner diameter and outer diameter are identical as shown in FIG. 3. However, resilient mounting assemblies 32 differing in length, resilient mounting elements 14 differing in stiffness, as well as cavities differing in size in the resilient mounting element 14, in combination with differing transfer ducts 22 may be used. More particularly, it is possible to make use of a resilient mounting assembly 32a having two or more transfer ducts 22.

Furthermore, various types of end caps 33a, 33b may be provided. End cap 33b corresponds to that as shown in FIG. 1 and FIG. 2, it being configured relatively rigid because the diaphragm 15 is relatively thick. As an alternative, it is also possible to use an end cap 33a having a pliant characteristic. Instead of the diaphragm 15, a thin diaphragm 29 in combination with a thickened portion 28 on the inner side of the insert 17 serving as an abutment may be provided. The inner diameter of the rings 16 and the outer diameter in this case are identical.

To improve the mounting, a decoupler 35 and/or plunger 36 may also be provided. The decoupler 35 includes a spacer ring 37 as well as a hollow diaphragm 40 in a cage 41 that is provided with a port (not shown) so that the outer side of the diaphragm 40 is actuated by the hydraulic fluid. Low amplitude loads of the bush 10 result in the diaphragm 40 being compressed without a flow materializing in the transfer duct 22, so that the bush 10 reacts relatively pliantly. It is not until high amplitude loads materialize that there is also a flow in the transfer duct 22, the hydraulic damping of which counteracts the load. The axially expansion of the spacer ring 37 corresponds to that of the cage 41.

For rigidity, the plunger 36 includes an insert 38 including a coating 39. Here too, a spacer ring 37 is provided. When the mounting is loaded, the plunger 36 is moved relative to the spacer ring 37 so that additional hydraulic damping is achieved in the gap between the plunger 36 and spacer ring 37.

The spacer rings 37 serve in both the decoupler 35 and plunger 36 as abutments for the rings 16 and mounting cores 13. It is assured that the axial dimensions at the inner sleeve 11 correspond to the dimensions at the outer sleeve 12. However, in special embodiments, one or both of the spacer rings 37 may be omitted, the rings 16 of the end caps then being relocated axially inwardly in the direction of the mounting core 13.

The bush 10 in accordance with the invention features a substantially enhanced damping effect attributable to the overlap of the mounting core 13 and insert 17. Furthermore, the resilient mounting element 14 is totally closed off from the environment and separate from the end caps 33 in thus enabling differing materials to be used for the resilient mounting element 14 and diaphragm 15, 29 to achieve fast, facilitated assembly. In addition, due to the resilient mounting assembly 32 and the end caps 33 now being separate a modular configuration of the bush 10 is achieved for adapting to the various circumstances in each case.

I claim:

1. A hydraulic damping bush for damping loads in a main loading direction, comprising:
    inner and outer sleeves together enclosing a space and defining a longitudinal direction;
    a resilient mounting assembly disposed between said inner sleeve and said outer sleeve;
    at least two end caps connecting said inner sleeve to said outer sleeve, capping said space enclosed by said inner sleeve and said outer sleeve, being formed separately from said resilient mounting assembly, and each having a rigid member mutually overlapping in a direction perpendicular to said main loading direction to define an overlapping region;
    two chambers charged with a hydraulic damping fluid; and
    a transfer duct interconnecting said two chambers and having an inlet, an outlet, and a main loading direction oriented parallel to said longitudinal axis of said inner sleeve and said outer sleeve;
    each of said chambers being defined by one of said resilient mounting assembly, a component adjoining the resilient mounting assembly, and one of said end caps; and
    said inlet and said outlet of said transfer duct being located in said overlapping portion of said rigid members of said resilient mounting assembly and said end caps.

2. The bush according to claim 1, wherein said resilient mounting assembly and said end caps are disposed inline in said main loading direction.

3. The bush according to claim 1, wherein:
    said inner sleeve has a rim; and
    said resilient mounting assembly and said end caps are mounted on said inner sleeve and fixed by flanging said rim of said inner sleeve.

4. The bush according to claim 1, wherein:
    said resilient mounting assembly and said inner sleeve are grouped together into a single inner part;
    said inner part has a rim; and
    said end caps are mounted and fixed on said inner part by flanging said rim of said inner part.

5. The bush according to claim 1, wherein:
    said outer sleeve has rim; and
    said rim of said outer sleeve fixes said outer sleeve by flanging.

6. The bush according to claim 1, wherein said transfer duct is disposed in said resilient mounting assembly.

7. The bush according to claim 1, wherein said transfer duct is configured linearly and oriented parallel to said main loading direction.

8. The bush according to claim 1, wherein said transfer duct is helical.

9. The bush according to claim 1, further comprising a decoupler.

10. The bush according to claim 1, further comprising a plunger.

11. The bush according to claim 1, wherein said resilient mounting assembly and said end caps are rotationally symmetrical.

12. The bush according to claim 9, wherein said decoupler is rotationally symmetrical.

13. The bush according to claim 10, wherein said plunger is rotationally symmetrical.

14. The bush according to claim 1, wherein said inner sleeve has a port formed therein for charging said chambers with the hydraulic damping fluid.

15. The bush according to claim 4, wherein said inner part has a port formed therein for charging said chambers with the hydraulic damping fluid.

16. The bush according to claim 14, wherein said port is closed by one of said end caps.

17. The bush according to claim 14, wherein said port is closable by one of said end caps following assembly of said bush.

18. The bush according to claim 15, wherein said port is closed by one of said end caps.

19. The bush according to claim 15, wherein said port is closable by one of said end caps following assembly of said bush.

20. The bush according to claim 1, wherein at least one of said end caps is provided with a port for charging said chambers with hydraulic damping fluid.

21. A hydraulic damping bush for damping loads in an automobile along a main loading direction, comprising:
    inner and outer sleeves together enclosing a space and defining a longitudinal direction;
    a resilient mounting assembly disposed between said inner sleeve and said outer sleeve;
    at least two end caps connecting said inner sleeve to said outer sleeve, capping said space enclosed by said inner sleeve and said outer sleeve, being formed separately from said resilient mounting assembly, and each having a rigid member mutually overlapping in a direction perpendicular to said main loading direction to define an overlapping region;
    two chambers charged with a hydraulic damping fluid; and
    a transfer duct interconnecting said two chambers and having an inlet, an outlet, and a main loading direction oriented parallel to said longitudinal axis of said inner sleeve and said outer sleeve;
    each of said chambers being defined by one of said resilient mounting assembly, a component adjoining the resilient mounting assembly, and one of said end caps; and
    said inlet and said outlet of said transfer duct being located in said overlapping portion of said rigid members of said resilient mounting assembly and said end caps.

22. A method for dampening loads with a bush according to claim 1, which comprises installing the bush in an automobile.

23. The method according to claim 22, which further comprises forming a port in said inner sleeve.

24. The method according to claim 23, which further comprises charging the chambers by adding the hydraulic damping fluid through the port.

25. The method according to claim 23, which further comprises closing the port with one of the end caps.

* * * * *